United States Patent [19]

Medley, III

[11] 4,236,650

[45] Dec. 2, 1980

[54] SINGLE COPY PERIODICAL DISPENSER

[76] Inventor: Frank W. Medley, III, 5121 Regent Dr., Nashville, Tenn. 37220

[21] Appl. No.: 50,307

[22] Filed: Jun. 20, 1979

[51] Int. Cl.[3] .......... B65G 59/02

[52] U.S. Cl. .......... 221/226; 221/259

[58] Field of Search .......... 221/227, 279, 226, 259, 221/277, 228, 280, 229, 231; 194/51, 59, 65; 271/19, 21, 22; 232/47, 49, 51

[56] References Cited

U.S. PATENT DOCUMENTS

| | | | |
|---|---|---|---|
| 423,073 | 3/1890 | Neiswanger | 194/65 |
| 3,768,695 | 10/1973 | Pearson | 221/227 |
| 3,942,683 | 3/1976 | Haas | 221/229 |

*Primary Examiner*—Stanley H. Tollberg

*Attorney, Agent, or Firm*—Leudeka & Fitch

[57] ABSTRACT

A dispensing apparatus for dispensing individual ones of a stack of flexible, layered articles, including a first article and adjacent articles, includes a housing. An access opening adapted to permit individual withdrawal of the articles by an operator is defined in the housing. A magazine locates the first article in a position adjacent to the access opening. A scoop is pivotally mounted adjacent to the access opening to pivot between a closed position closing the access opening and an open position permitting access to the first article through the access opening and preventing access to adjacent articles.

10 Claims, 6 Drawing Figures

SINGLE COPY PERIODICAL DISPENSER

The present invention relates generally to the field of dispensing apparatus and more particularly to dispensing apparatus for flexible, layered articles such as newspapers, magazines and the like.

The primary benefit of mechanical dispensing apparatus for articles such as newspapers, magazines and the like lies in the minimal labor expense involved in keeping them supplied as compared to having a person selling the articles one by one. As a result of this benefit one can find a coin-operated newspaper dispenser at practically every intersection of commercial districts. These dispensers generally comprise a housing which contains a stack of newspapers. On the front of the housing is a hinged door, which is latched by a standard coin box. A customer desiring a newspaper simply inserts the correct number of coins into the coin box to release the latched door. Upon opening the door, the customer reaches in and withdraws a newspaper from the stack. The vendor merely has to load the dispenser with a number of newspapers, based upon estimated demand, and remove the collected coins at the end of the day. A single vendor can service a large number of dispensers. The costs of maintenance are minimal due to the small number of moving parts. However, the cost benefit disappears rapidly when customers withdraw a greater number of articles than the number for which the customers have paid. Such multiple withdrawals are frequently a problem when the newspapers contain special inserts or even regular features such as television program guides or merchandise coupons, for example.

In view of these loss situations, the vendor is faced with the choice of either relying upon customer honesty and accepting an uncontrollable level of lost articles or else paying the additional labor expense of policing the dispensers. The latter option requires additional personnel and is thus totally unacceptable economically. Therefore, vendors of newspaper at least have generally taken the first option and suffered the losses thereof.

The vendor has an additional option available, namely to provide a dispensing apparatus which prevents customers from removing more than a single article at one time. While there have been previous efforts along this approach, such efforts have not been particularly successful, as shown by the fact that newspaper dispensers in use today continue to permit the removal of several newspapers at once.

The reasons for the lack of success of prior single issue newspaper dispensers are primarily attributable to the nature of the newspapers themselves. Unlike candy bars and many other individually dispensed articles, a newspaper is composed of several flexible, loosely-connected layers. Many prior apparatus have been designed to laterally push a single newspaper from the top or bottom of a stack, through a narrow slot. The slot is made small enough so that the customer is prevented from reaching to the remaining papers. However, the difficulties of pushing a flexible article like a newspaper are quite apparent. Unless the paper is fully supported from above, below, and laterally along its entire intended path, a small frictional disturbance will cause the paper to deviate from the intended path and miss the intended slot and/or disassemble. Then, once a single paper has been misdirected or disassembled within the dispenser, it is jammed and no further papers can be dispensed until the vendor arrives to correct the malfunctioning dispenser. In light of the short "shelf life" of a newspaper, i.e. usually just a few hours, such delays are intolerable.

In addition, the mechanism required to manipulate the newspapers from the stack through a slot of prior dispensing apparatus are relatively complex. Aside from the attendant expense, complex mechanisms provide ample opportunities for malfunction. The complexity of newspaper dispensers in particular must be minimized, however, because newspapers fluctuate in size considerably from one day of the week to another. A complex mechanism for dispensing newspapers faces a great obstacle in adapting to varying thicknesses of newspapers, frequently requiring adjustment for varying thicknesses.

It is therefore an object of the present invention to provide a dispensing apparatus for flexible, layered articles, such as newspapers, and the like. It is also an object to provide a simple dispensing apparatus for articles, such as newspapers and the like, which does not permit removal of more than one article at one time. It is a further object to provide a dispensing apparatus including a minimal number of moving parts. It is also an object to provide a dispensing apparatus which can dispense newspapers of varying thicknesses without adjustment.

Further objects and advantages will become apparent when the following description is considered in connection with the drawings in which.

Figure 1:
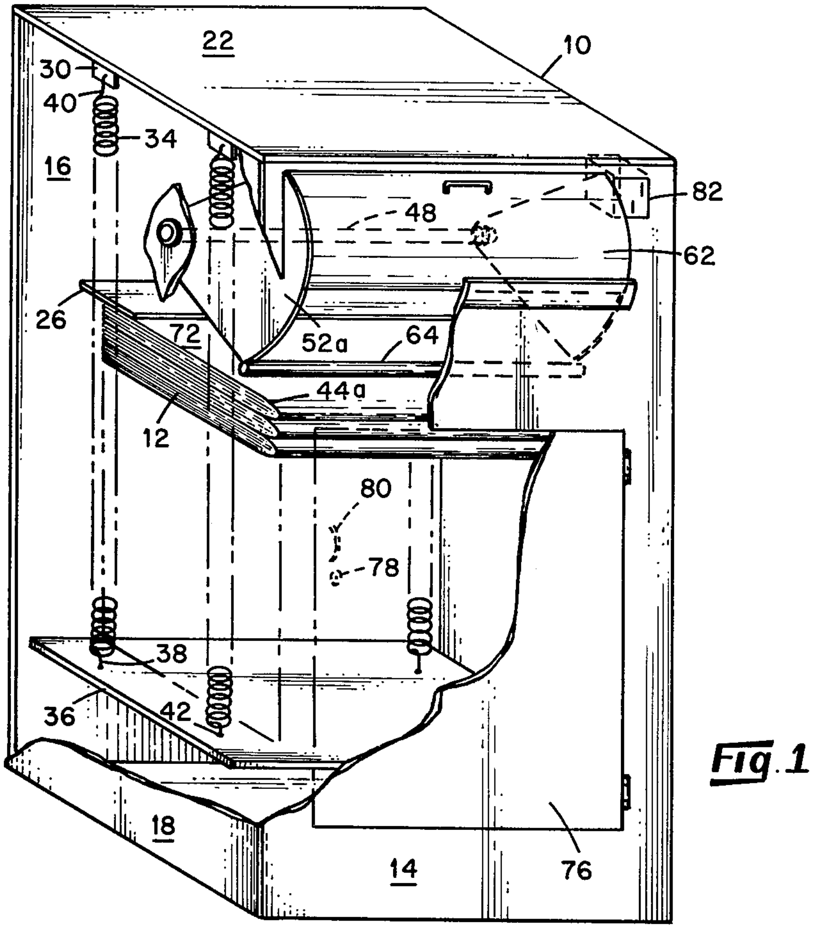
FIG. 1 is a perspective view partially broken away, of a dispensing apparatus embodying various of the features of the present invention.
Figure 6:
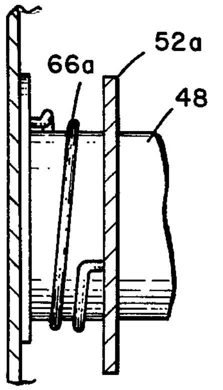
FIG. 6 is an enlarged cross-sectional view taken along line 6—6 of FIG. 5.
Figure 5:
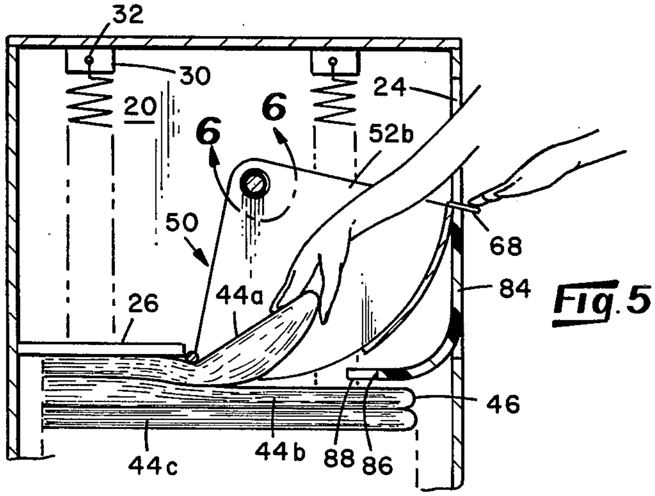
FIG. 5 is a cross-sectional elevational view of an alternative embodiment of a dispensing apparatus embodying various of the features of the present invention in a fully open condition.

Generally, a dispensing apparatus in accordance with the present invention includes a magazine for storing a stack of flexible, layered articles, and a housing for the magazine and stored articles. An access opening is defined in the housing and a scoop means is pivotally secured to the housing adjacent to the access opening for pivotal motion between a closed position in which the access opening is closed and an open position in which an operator has access to only a single article, and access to the adjacent papers is blocked by a portion of the scoop means.

Referring more particularly to the drawings, a dispenser constructed in accordance with one embodiment of the present invention includes a vertically upstanding housing 10, adapted to receive a vertical stack 12 of folded newspapers. The housing 10 is rectangular in lateral cross-section, having a planar front wall 14, a planar rear wall 16 and a pair of planar side walls 18 and 20 interconnecting the front wall 14 and rear wall 16. A horizontal top wall 22 interconnects the front wall 14, rear wall 16 and the side walls 18 and 20.

An access opening 24 is defined in the upper portion of the front wall 14 of the housing 10, adjacent to the top wall 22. The access opening 24 is of a size adapted to permit an operator to reach through the opening 24 to grasp and withdraw a newspaper from the stack 12 located within the housing 10. In the depicted embodiment, the opening 24 is rectangular, about eight inches in height and about sixteen inches in width.

The housing 10 includes a rigid stop ledge 26, secured to the rear wall 16 as by welding for example. The ledge 26 extends across the width of the rear wall 16 by a distance equivalent to the width of a newspaper page and extends inwardly several inches, but less than one-half of the distance between the front wall 14 and the rear wall 16. The ledge 26 is located at a height below the lower edge 28 of the opening 24.

Four tabs 30 are secured to the top wall 22, as by welding, and extend downwardly therefrom. An opening 32 is defined in each of the tabs 30. The openings 32 are at least about one-eighth inch in diameter, sufficiently large to permit secure attachment of a coil spring 34 thereto. A pair of tabs 30 is located adjacent each of the side walls 18 and 20. Each pair of tabs 30 is spaced apart by a distance equal to about one-half the width of the side walls 18 and 20 and centered on the respective side wall 18 or 20.

A horizontal rectangular platform 36, having dimensions slightly less than those of the lateral cross-section of the housing 10, is received within the housing 10. The platform 36 is adapted to carry the vertical stack 12 of newspapers as it moves vertically within the housing 10.

Four identical elongated coil springs 34, each having a first end 38 and a second end 40, are secured to the platform 36 at the first end 38 and to one of the tabs 30 at the second end 40 to continuously urge the platform vertically upwardly to the stop ledge 26. The springs 34 are secured to the tabs 30 and platform 36 by hooking through the openings 32 and 42, respectively. The length and tension of the springs 34 are such that the platform 36 is continuously urged upwardly, regardless of whether the platform 36 is fully loaded with a stack 12 of newspapers, so that the springs 34 are fully extended, or the platform is empty and located adjacent the stop ledge 26.

The stack 12 of newspapers includes a first or top newspaper 44*a* and a plurality of adjacent newspapers 44*b* and 44*c*. Each of the newspapers 44*a*, 44*b* and 44*c* is folded at least once to provide a final fold 46. The newspapers 44*a*, 44*b* and 44*c* are stacked on the platform 36 such that the final folds 46 of all of the papers lie in a common plane. The stack 12 is located within the housing 10 such that the common plane defined by the final folds 46 is parallel to and adjacent to the front wall 14 of the housing 10. The upwardly urged platform 36 locates the top newspaper 44*a* in contact with the stop ledge 26 from below.

An elongated axle 48 is secured between the side walls 18 and 20 in a horizontal position, parallel to the front wall 14. Scoop means 50, including a pair of planar frame members 52*a* and 52*b* is pivotally attached to the axle 48. The frame members 52*a* and 52*b* are parallel to the respective side walls 18 and 20 and each pivots within the plane it defines. Each of the frame members 52*a* and 52*b* is generally pie shaped, having an interior corner 54, an upper corner 56 and a lower corner 58. An outwardly curved edge 60 extends between the upper corner 56 and the lower corner 58 of each of the frame members 52*a* and 52*b*. The frame members 52*a* and 52*b* are pivotally attached to the axle 48 at the interior corners 54.

Figure 2:
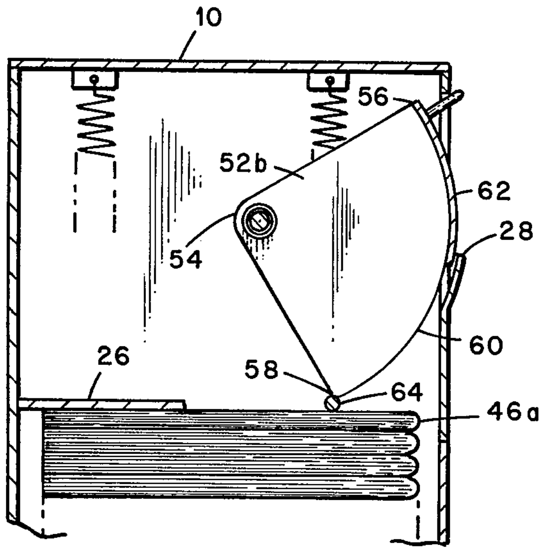
FIG. 2 is a cross-sectional elevational view of the dispensing apparatus of FIG. 1, in a closed condition.

A semi-cylindrical shield 62 connects the frame members 52*a* and 52*b* along the edge 60 between the upper corner 56 and a point about halfway between the upper corner 56 and lower corner 58 of each frame member 52*a* and 52*b*. The shield 62 is slightly narrower than the width of the opening 24 so that the shield 62 pivots freely through the opening 24. The height of the shield 62 is greater than the height of the opening 24 so that in a closed position, as illustrated in FIGS. 1 and 2, the shield 60 completely blocks the opening 24.

An elongated pressure roller 64 connects the lower corners 58 of the frame members 52*a* and 52*b*. The roller 64 is preferably rotatably attached to the frame members 52*a* and 52*b*. As desired, however, the roller 64 may be fixedly attached to the frame members 52*a* and 52*b* or spring-loaded with channels for restrained movement within the plane defined by the axle 48 and the roller 64.

The axle 48 is positioned within the housing 10 in a location such that the scoop 50 is pivotable between a closed position, and an open position. In the closed position, as shown particularly in FIG. 2, the shield 62 completely blocks the access opening 24 and the pressure roller 64 rests upon the top newspaper 44*a* within a few inches of the final fold 46*a*. The roller 64 is spaced from the front wall 14 by a distance less than the distance between the axle 48 and the front wall 14, preferably about four inches less, thus ensuring that as the scoop 50 is pivoted about the axle 48, the roller 64 travels downwardly, as well as rearwardly to firmly engage the top newspaper 44*a*.

The scoop 50 is biased to the closed position by a pair of coil springs 66, one of which is wound about each end of the axle 48. One end of each coil spring 66 is secured to the housing side wall 18 or 20 and the other end of each spring 66 is secured to the adjacent frame member 52*a* or 52*b*, respectively.

Figure 3:
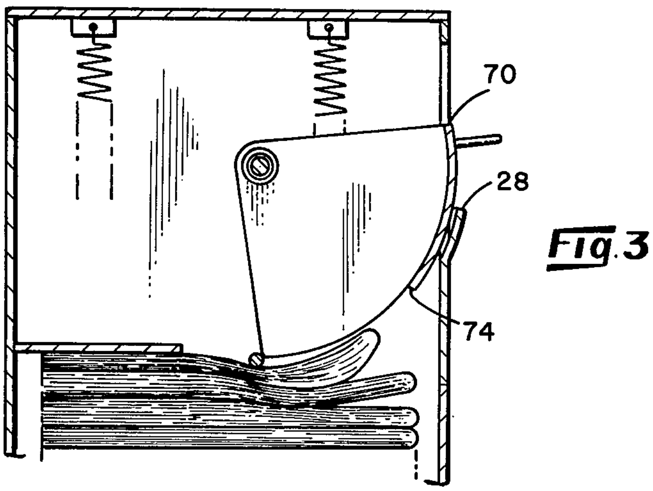
FIG. 3 is a cross-sectional elevational view of the dispensing apparatus of FIG. 1, in a partially open condition.

In operation, a handle 68, secured to the shield 62 adjacent to the upper edge 70, permits an operator to pivot the scoop 50 about the axle 48, against the axial resistance of the coil springs 66. As the scoop 50 pivots about the axle 48, the shield 62 is lowered away from the access opening 24, permitting the operator to reach into the housing between the frame members 52*a* and 52*b*. Simultaneously, the roller 64 presses downwardly and rearwardly against the top newspaper 44*a*. The pressure of the roller 64 causes the top layer 72 of the top newspaper 44*a* to slide rearwardly over the remaining layers of the top newspaper 44*a*. As shown in FIG. 3, as the roller 64 presses along the surface 72 of the top paper 44*a*, the paper curls upwardly at the final fold 46. Simultaneously, the lower edge 74 of the shield 62 enters the open space developed between the curling top paper 44*a* and the immediately adjacent paper 44*b*.

Figure 4:
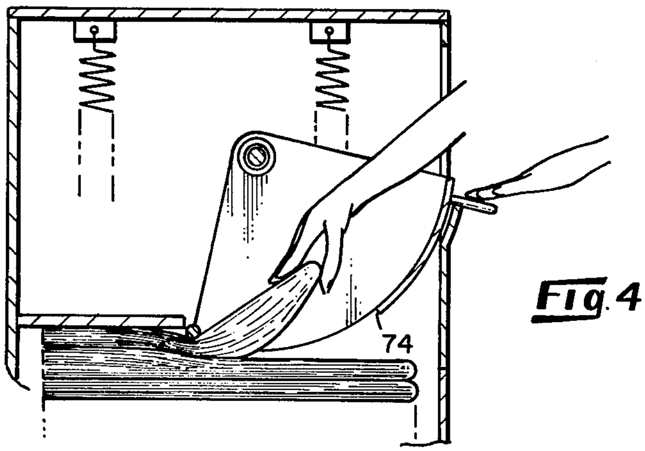
FIG. 4 is a cross-sectional elevational view of the dispensing apparatus of FIG. 1, in a fully open condition.

Ultimately, as shown particularly in FIG. 4, the roller 64 stops against the ledge 26 and the handle 68 stops against the lower edge 28 of the opening 24. At this point, the open position for the scoop 50, the access opening 24 is not blocked at all by the shield 62, so that the operator can freely reach between the frame members 52*a* and 52*b* to grasp the upwardly curled top newspaper 44*a*. The roller 64 is at approximately the same level as the ledge 26, so that it does not apply downward pressure nor inhibit withdrawal of the top newspaper 44*a* by the operator. However, the operator is also prevented from reaching the adjacent newspapers by the shield 62 and the ledge 26.

After withdrawal of the top newspaper 44a the scoop handle 68 is released. The springs 66 cause the scoop 50 to return to the closed position again.

The combination of the platform 36 carrying a stack 12 of newspapers and the springs 34 secured to the tabs 30 and the platform 36 provides a reloadable magazine within the housing 10. Each time a newspaper is removed from the top of the stack 12, the springs 34 urge the platform 36 and the remainder of the stack 12 upwardly until the top newspaper 44a is replaced by immediately adjacent newspaper 44b.

A service door 76 is also included in the front wall 14. The service door 76 is of a size and shape adapted to permit an entire stack of newspapers to be inserted at one time into the housing 10. Preferably, a lock 78 and handle 80 are included in the service door for security and ease of operation.

In a preferred embodiment, a standard coin box 82 is included in the housing front wall 14 next to the opening 24. A latch mechanism adopted to engage the coin box 82 is secured to the scoop 50 so that the scoop 50 is locked in the closed position unless the appropriate number of coins is placed in the box 82 to relese the scoop 50.

In an alternative embodiment of the dispenser described hereinabove, a flexible rectangular cover 84 is secured along the upper edge 70 of the shield 62. The edge 86 of the rectangular cover 84 opposite the edge 70 is disposed within a channel 88 defined in the front wall 14 of the housing 10. The cover 84 prevents precipitation, for example, from entering the housing between the scoop 50 and the housing, particularly along the lower edge 74 of the shield 62. As the scoop is pivoted to the open position, the cover 84 slides downwardly into the channel 88, and then returns with the scoop 50 to the closed position.

It is recognized that the dispenser described hereinabove may be inverted to locate the stack 12 above the access opening 24. In this manner the platform 36 and springs 34 are obviated because gravity provides the urging means for the magazine. The stack 12 then merely rests upon the ledge 26 and the roller 64 and the newspaper at the bottom of the stack is the first newspaper withdrawn. The pressure roller presses upwardly against the first newspaper and the stack moves downwardly to replace the first newspaper with the immediately adjacent newspaper.

The dispenser described hereinabove permits a customer to reach into the housing to withdraw the first newspaper from a stack. At the same time, the customer is prevented from reaching the remaining newspapers on the stack. Moreover, the dispensed newspaper is not actually removed from the stack mechanically, so that the mechanism is exceedingly simple and no adjustments are required for varying sized newspapers.

While a preferred embodiment has been shown and described, it will be understood that it is intended to cover all modifications and alternate constructions falling within the scope of the invention as defined in the appended claims.

What is claimed is:

1. A dispensing apparatus for dispensing individual ones of a stack of flexible, layered articles including a first article, and adjacent articles comprising a housing, an access opening defined in said housing, said opening being adapted to permit individual withdrawal of said articles by an operator, magazine means for locating said first article in a position adjacent to said access opening and scoop means pivotally mounted adjacent to said access opening, said scoop means being pivotable from a closed position closing said access opening, passing between said first article and said adjacent articles, to an open position permitting access to said first article through said access opening and preventing access to adjacent articles.

2. An apparatus as defined in claim 1 wherein said scoop means is pivotally mounted upon a horizontal axle.

3. A dispensing apparatus for dispensing individual ones of a stack of flexible, layered articles, including a first article and adjacent articles, comprising a housing, an access opening defined in said housing, said opening being adapted to permit individual withdrawal of said articles by an operator, magazine means for locating said first article in a position adjacent to said access opening, movable pressure means for engaging said first article and curling said first article away from said adjacent articles and shield means movable in concert with said pressure means said shield means being movable between a closed position preventing access to said stack and an open position permitting access to said first article through said access opening and preventing access to adjacent articles.

4. An apparatus as defined in claim 3 wherein said magazine means comprises a horizontally disposed platform adapted to carry said stack and means for continuously urging said platform toward said access opening.

5. An apparatus as defined in claim 3 and further comprising flexible cover means for said shield means.

6. An apparatus as defined in claim 3 wherein said shield means is biased to the closed position by spring means.

7. An apparatus as defined in claim 4 wherein said urging means comprise a plurality of coil springs secured to said platform and said housing.

8. A dispensing apparatus for dispensing individual ones of a stack of flexible, layered articles including a first article and adjacent articles comprising a housing, an access opening defined in said housing, said opening being adapted to permit individual withdrawal of said articles by an operator, magazine means for locating said first article in a position adjacent to said access opening and scoop means, comprising a pair of spaced apart frame members interconnected by a shield and a roller member, pivotally mounted adjacent to said access opening, said scoop means being pivotable between a closed position closing said access opening and an open position permitting access to said first article through said access opening and preventing access to adajcent articles.

9. An apparatus as defined in claim 8 wherein said roller member engages said top article as said scoop is pivoted between said closed position and said open position.

10. An apparatus as defined in claim 8 wherein said roller member is spring loaded.

* * * * *